US006808792B1

(12) United States Patent
Weber

(10) Patent No.: US 6,808,792 B1
(45) Date of Patent: Oct. 26, 2004

(54) TRANSFER FOIL FOR APPLYING A DECORATIVE LAYER ARRANGEMENT TO A SUBSTRATE

(75) Inventor: Klaus Weber, Zirndorf (DE)

(73) Assignee: Leonard Kurz GmbH & Co., Furth (DE)

(*) Notice: Subject to any disclaimer, the term of this patent is extended or adjusted under 35 U.S.C. 154(b) by 0 days.

(21) Appl. No.: 10/030,824

(22) PCT Filed: Aug. 16, 2000

(86) PCT No.: PCT/DE00/02804

§ 371 (c)(1),
(2), (4) Date: Jan. 11, 2002

(87) PCT Pub. No.: WO01/15914

PCT Pub. Date: Mar. 8, 2001

(30) Foreign Application Priority Data

Aug. 27, 1999 (DE) ........................................ 199 40 790

(51) Int. Cl.[7] ................................................ B32B 3/00

(52) U.S. Cl. .................... 428/202; 428/914; 428/411.1; 428/195.1

(58) Field of Search ................................ 428/202, 690, 428/914, 411.1

(56) References Cited

U.S. PATENT DOCUMENTS

| | | | | | |
|---|---|---|---|---|---|
| 3,900,643 | A | * | 8/1975 | Kluge et al. | 428/41.5 |
| 3,922,435 | A | | 11/1975 | Asnes | |
| 4,038,123 | A | | 7/1977 | Sammis | |
| 4,089,722 | A | | 5/1978 | Holoubek | |
| 4,294,641 | A | * | 10/1981 | Reed et al. | 156/234 |
| 4,303,717 | A | | 12/1981 | Andrews | |
| 4,328,276 | A | * | 5/1982 | Swarovski | 428/213 |
| 4,399,178 | A | * | 8/1983 | Barta | 428/202 |
| 5,575,507 | A | * | 11/1996 | Yamauchi et al. | 283/86 |
| 5,681,644 | A | | 10/1997 | Dressler | |
| 5,731,898 | A | * | 3/1998 | Orzi et al. | 359/587 |
| 5,925,431 | A | * | 7/1999 | Schoenfelder | 428/40.1 |
| 5,932,319 | A | | 8/1999 | Makar et al. | |
| 5,962,110 | A | * | 10/1999 | Penke-Wevelhoff | 428/195 |

FOREIGN PATENT DOCUMENTS

| | | |
|---|---|---|
| DE | 3022744 C2 | 2/1981 |
| DE | 3514852 A1 | 10/1986 |
| DE | 4030493 A1 | 4/1992 |
| DE | 4433858 C1 | 5/1996 |
| DE | 9321358 U1 | 11/1997 |
| DE | 29805481 U1 | 9/1998 |
| FR | 2466348 | 4/1981 |
| JP | 06263487 | 9/1995 |
| WO | WO 89/10259 | 11/1989 |
| WO | WO 95/26872 | 10/1995 |

* cited by examiner

*Primary Examiner*—Cynthia H Kelly
*Assistant Examiner*—Tamra Dicus
(74) *Attorney, Agent, or Firm*—Hoffmann & Baron, LLP

(57) ABSTRACT

There is proposed a transfer foil which makes it possible for decorative layer arrangements as are known from hot stamping foils to be transferred onto a substrate without a high level of material expenditure. For that purpose the carrier film of a hot stamping foil is fixedly joined by means of a permanent adhesive to the base foil.

11 Claims, 1 Drawing Sheet

TRANSFER FOIL FOR APPLYING A DECORATIVE LAYER ARRANGEMENT TO A SUBSTRATE

This application claims priority based on an International Application filed under the Patent Cooperation Treaty PCT/DE00/02804, filed on Aug. 16, 2000, and German Patent Application No. 199 40 790.8, filed on Aug. 27, 1999.

BACKGROUND OF THE INVENTION

The invention concerns transfer foils for applying a decorative layer arrangement formed by at least one lacquer layer and a heat-activatable adhesive layer to a substrate.

Safeguarding documents is becoming increasingly important, in which respect the term "documents" is used to mean not only identity papers, value-bearing papers or stocks and shares or the like but for example also banknotes, cheques, credit cards etc. Value-bearing documents, for example banknotes, very frequently involve using security elements formed by a decorative layer arrangement which for example includes structures having an optical-diffraction or holographic effect. In addition however it is also possible to provide given graphic configurations as security elements. In the case of value-bearing documents issued in large numbers the security elements are very frequently applied by means of a transfer foil, for example a hot stamping foil, in which case the decorative layer arrangement forming the security element usually includes at least one lacquer layer and a layer of a heat-activatable adhesive which serves to join the lacquer layer or assembly of lacquer layers which represent the actual security element, to the substrate, for example a banknote, a cheque, an identity document or a credit card.

In most cases the operation of transferring the security element onto the document is effected by machine. In that situation processing of transfer foils, mostly so-called hot stamping foils, gives rise to few problems if the machines are of a suitable design.

The decorative layer arrangements of hot stamping foils are only of very small thickness. They comprise essentially only some lacquer layers. The advantage of this small thickness of the security elements is that, when the security elements are arranged only in a given region of the document, there are nonetheless no fundamental differences in thickness in the document. Such differences in thickness could in fact give rise to problems in regard to the stacking operation. A further advantage of using decorative layer arrangements comprising a plurality of lacquer layers as security elements is that layer arrangements of that kind are mechanically not very stable. If therefore the attempt is made to pull a security element off the document, it is virtually safe to assume that the security element comprising the various lacquer layers will be destroyed so that the forgery or the attempt at forgery can be easily detected.

The use of hot stamping foils for applying security elements to documents does however suffer from the disadvantage that it is always necessary to incur a corresponding amount of machine expenditure because applying hot stamping foil decorative layers as security elements to substrates by hand is practically impossible, more specifically because of the very small thickness of the decorative layer arrangement of a hot stamping foil. This means that for specific situations of use, the use of hot stamping foils as a security element was hitherto out of the question because the machine expenditure required would not have been in reasonable relationship with the result attained.

In certain cases it would moreover be highly advantageous if a security element could be individualised before being applied to a document. That option is worthwhile in particular in relation to personal documents. It would then be possible to use a security element which, before being applied to the document, was individualised with personal data of the owner of the document, for example a photograph, name or date of birth etc. That possibility is out of the question in a practical context if security elements are transferred onto a document by means of a known hot stamping foil, more specifically in particular for the reason that individually printing security elements which are always present in very large numbers on hot stamping foils is once again out of the question, because of the expense involved, if only a few, correspondingly individualised security elements are required. By way of example the situation is such that only very few security elements with person-related data are always required for personal identifications, passports etc. Frequently even one such element is sufficient, which is then a component part of the personal identification or passport.

SUMMARY OF THE INVENTION

Now, the object of the invention is to provide a transfer foil by means of which it is possible to transfer a security or decorative element which in terms of its structure basically corresponds to the decorative layer arrangement of a per se known hot stamping foil, wherein application of the decorative layer arrangement to the substrate, for example a document, is to be possible, even without extensive machine equipment.

In accordance with the invention, to attain that object, there is proposed a transfer foil of the kind set forth in the opening part of this specification, which includes a base foil which is connected by means of a permanent adhesive to the one surface of a carrier film, at the other surface of which is arranged the decorative layer arrangement which is releasable from the carrier film under the effect of heat, and which on its side remote from the carrier film has the heat-activatable adhesive layer serving for joining to the substrate.

The transfer foil according to the invention therefore differs from per se known hot stamping foils in that, in addition to the carrier or backing film which is provided in known hot stamping foils for stabilisation of the decorative layer arrangement, there is an additional base foil which is joined to the carrier film by means of a permanent adhesive. In that respect the carrier film and the base film are usually joined after manufacture of the actual hot stamping foil. In accordance with the invention therefore there is afforded a transfer foil which is of comparatively, high stability because, instead of the relatively thin carrier film which is hitherto usual in the case of hot stamping foils, there is a combination of base foil and carrier film which enjoys the necessary stability so that the transfer foil can be handled neatly and tidily even without expensive machines. In use, the user lays a transfer foil of that kind with the side on which there is the decorative layer arrangement with the adhesive on the substrate. Then, by the appropriate action of pressure and heat, the decorative layer arrangement is joined to the substrate and then the carrier film jointly with the base foil is pulled off the decorative layer arrangement which remains behind on the substrate. Thus, when using the transfer foil in accordance with the invention, there is the possibility of transferring a very thin decorative layer arrangement which hitherto could only be applied by means of the hot stamping foil procedure to the substrate, for example a document. At the same time however handling of the transfer foil is greatly simplified by virtue of the stability of the combination of base foil and carrier film. In the case of the transfer foil according to the invention the decorative layer arrangement can be designed in the manner which is known from hot stamping foils. In particular there is no need to provide for corresponding stability of the decorative layer arrangement in itself because that decorative layer arrangement is sufficiently stabilised during manufacture by virtue of the presence of the carrier film.

In accordance with the invention therefore there is proposed a transfer foil which, in comparison with known hot stamping foils, enjoys a substantially wider area of use, and which in particular can be securely and reliably processed even by means of very simple apparatuses. Nonetheless the transfer foil in accordance with the invention, in regard to the decorative layer arrangement, enjoys all design configuration options known hitherto from hot stamping foils.

It has proven to be advantageous if the base foil is formed by a paper web which is siliconised on its surface remote from the carrier film and which detachably adheres with its siliconised surface to a carrier foil, for example a carrier paper. In that case for example a plurality of small security elements can be arranged on a common sheet, namely the carrier foil. For use in that respect, a security element comprising the base foil, carrier film and decorative layer arrangement is then released from the carrier foil and suitably transferred onto the intended substrate.

That operation of transferring individual elements can advantageously be made easier if the base foil with the carrier film and the decorative layer arrangement is subdivided into a plurality of label-like individual elements, wherein a plurality of such individual elements are arranged on a carrier foil web in such a way they can be pulled therefrom. In that respect the subdivision is desirably such that the individual elements are formed by stamping or perforating the base foil, the carrier film and the decorative layer arrangement along their intended peripheral edges, without the carrier foil being cut.

A particularly advantageous embodiment of the transfer foil according to the invention is designed in such a way that the decorative layer arrangement is transparent and the adhesive layer which serves for fixing the decorative layer arrangement to the substrate can be applied by printing by means of a printer, for example a laser printer or a thermal printer. In the case of a transfer foil of that kind, suitable individualisation can be effected for example by the operation of printing on the adhesive layer. It is for example possible for the side of a passport which contains the personal data to be safeguarded by using a transfer foil in accordance with the invention, in which case the basic information can already be applied upon manufacture of the transfer foil in the factory, in a suitable printing operation, for example between individual layers, which involve the entire surface area, of the decorative layer arrangement, while the person-related data, for example surname, forename, address, dates of birth and picture of the holder are then applied by printing before use of the transfer foil on the adhesive layer thereof by means of a suitable printer. After the individualising printing operation the transfer foil is then laid with the printed adhesive layer onto the substrate and fixed to the substrate by heat and possibly the action of pressure. This embodiment enjoys the advantage that the individualising details are concealed by the decorative layer arrangement of the transfer foil, in other words, a modification is not possible without at the same time damaging the decorative layer arrangement. If the attempt is made to pull the decorative layer arrangement off the substrate in order to alter the individualising data, it must be reckoned that the decorative layer arrangement will be destroyed. In addition in a normal situation it is to be assumed that the individualising data are also to be found on the substrate again because, with the usual processing conditions in regard to the transfer foil according to the invention, at least a certain proportion of the printing ink present on the adhesive layer is also directly joined to the substrate.

A further improvement in the transfer foil according to the invention in the sense of affording a safeguard is possible in accordance with the invention by virtue of the fact that the decorative layer arrangement has at least one replication lacquer layer provided at a surface with a structure having an optical-diffraction and/or holographic action. Structures of that kind with an optical-diffraction or holographic action are generally known per se from security elements formed by hot stamping foil decorative layer arrangements and for that reason do not have to be described in greater detail.

In regard to the previous security elements it is now frequently the case that the structure having an optical-diffraction or holographic action is covered by means of a reflective layer, generally a vapour-deposited metal layer, and is thereby better visible under incident light. In accordance with the invention it is preferred if the structure having the optical-diffraction and/or holographic action carries a transparent layer of a material whose refractive index is markedly higher than that of the transparent replication lacquer layer. With such a design configuration, that affords adequate visibility for the optically operative structure. At the same time however the decorative layer arrangement remains transparent so that it is still possible to perceive the substrate and any identifications possibly provided between the substrate and the decorative layer arrangement, for example, printing on the adhesive layer of the decorative layer arrangement. Preferably the material layer which enhances the visibility of the optically operative structure is produced by a layer of ZnS, $TiO_2$, SiO or a material having a similar action in terms of refraction being provided, for example by vapour deposition.

It is further provided in accordance with the invention that the heat-activatable adhesive layer serving for fixing to the substrate is formed by two adhesive layer portions, between which is arranged a marking produced in a printing process, wherein the marking can advantageously be formed by printing inks which are perceivable only upon illumination with light in predetermined wavelength ranges. When in this respect reference is made to two "adhesive layer portions", it is certainly not necessary for the two adhesive layer portions to be of the same composition and structure. On the contrary, consideration is given in particular to the situation where the first adhesive layer portion—as seen from the carrier film—is a bonding layer which provides that bonding to the vapour deposited layer which improves the visibility of the diffractive structure is particularly good. It would certainly also be possible to envisage the situation where there is only one adhesive layer, in which case then the marking produced in the printing process would have to be present directly on the layer which improves the visibility of the structure.

In accordance with the demands of the user, the sequence of layers of the decorative layer arrangement will be varied, in which respect usually firstly a hot stamping foil is produced with appropriate layers, and that hot stamping foil is then applied by lamination to the base foil. It will be appreciated that in this case, to join the carrier film of the hot stamping foil to the base foil, it is necessary to use an adhesive which, at the temperatures which are employed for applying the decorative layer arrangement to the substrate, does not suffer a reduction in its adhesive strength and which ensures that the base foil and the carrier film are securely held together.

A particularly advantageous embodiment of the transfer foil according to the invention is distinguished in that it includes the following mutually adjoining constituents or layers:

- a carrier paper web,
- a web of silicone paper which releasably adheres with its siliconised surface to the carrier paper web,
- a carrier film which is joined by means of a permanent adhesive to the non-siliconised surface of the silicone paper web, wherein on its free surface the carrier film has in succession the following layers:
  - a release layer which is present only if required,
  - a transparent replication lacquer layer which at its surface remote from the carrier film has the structure with the optical-diffraction and/or holographic action,
  - a layer which covers the structure at least in a region-wise manner, that layer being of a material with high refractive index in comparison with the replication lacquer layer,
  - a heat-activatable adhesive layer, and
  - possibly a second heat-activatable adhesive layer and a printed marking between the two heat-activatable adhesive layers, wherein
  - the replication lacquer layer, the layer of material with a high refractive index and the heat-activatable adhesive layer or layers are transparent and the adhesive layer forming the surface of the transfer foil which is remote from the carrier foil web is formed by a material which can be printed by means of a printer.

The transfer foil of the configuration described hereinbefore satisfies the demands stated in the opening part of this specification in an excellent fashion. It affords the possibility of applying a comparatively thin decorative layer arrangement which hitherto could be transferred only by means of a hot stamping foil, onto a substrate, without involving a high level of machine expenditure. At the same time the transfer foil according to the invention can be easily handled and it is readily possible to individualisingly print various security elements formed by means of a transfer foil according to the invention.

BRIEF DESCRIPTION OF THE DRAWINGS

Further features, details and advantages of the invention will be apparent from the description hereinafter of a preferred embodiment of a transfer foil with reference to the drawing.

In the drawing in which the Figures are each heavily diagrammatic and show a view in section.

DESCRIPTION OF THE PREFERRED EMBODIMENTS

Figure 1:
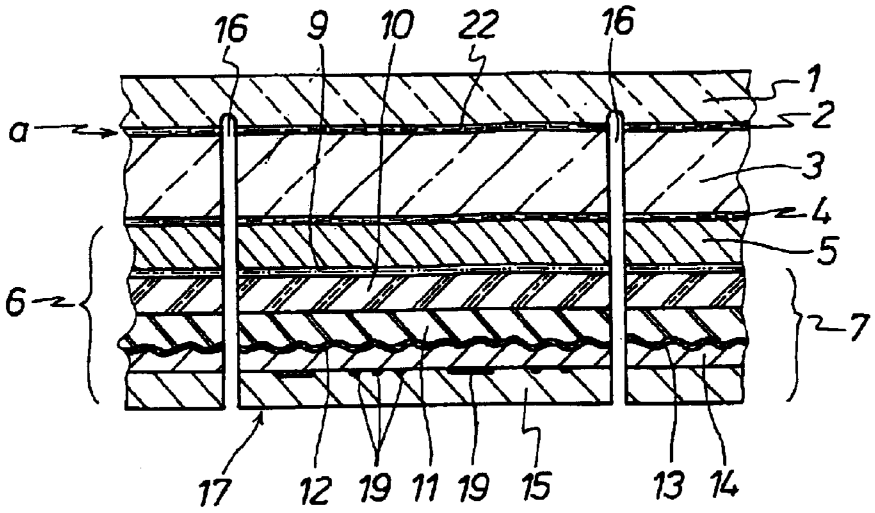
FIG. 1 illustrates a part of a sheet with a plurality of security elements formed by a transfer foil according to the invention.

The transfer foil shown in FIG. 1 includes—viewing from top to bottom in the drawing—a carrier foil 1 to which a base foil 3 is relatively easily releasably fixed by means of a suitable adhesive 2. The base foil 3 is joined fixedly and under the usual processing conditions non-detachably by means of a permanent adhesive 4 to the carrier film 5 of a hot stamping foil which is generally identified by reference 6 and which is basically of a known structure.

Figure 3:
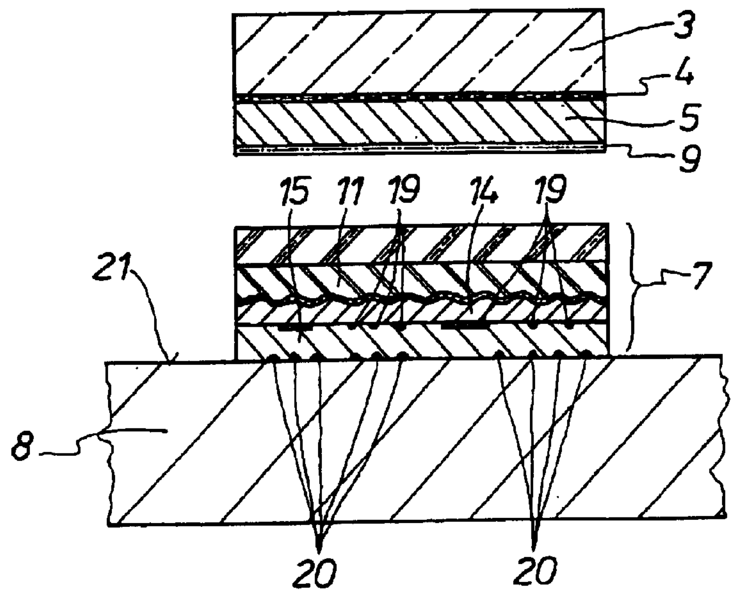
FIG. 3 shows a security element as shown in FIG. 2 after application to a substrate and after detachment of the decorative layer arrangement from the remaining layers.

The hot stamping foil 6 comprises on the one hand the carrier film 5 and on the other hand the decorative layer arrangement which is generally identified by reference 7 and which is releasable from the carrier film 5 and transferable onto a substrate 8 shown in FIG. 3, in the manner which is usual per se from the processing of hot stamping foils.

In the illustrated embodiment, the following layers are arranged on the side of the carrier film 5, which is remote from the base foil 3:

- a release layer 9,
- a protective lacquer layer 10,
- a replication lacquer layer 11 which, as diagrammatically indicated in the drawing, is provided with a structure 12 having an optical-diffraction or holographic action,
- a layer 13 of a material having a refractive index which is markedly different from that of the replication lacquer layer 11,
- a bonding or first adhesive layer 14, and
- a second adhesive layer 15 which serves to join the decorative layer arrangement 7 to the substrate 8.

It will be seen from FIG. 1 that the various layer portions of the transfer foil are subdivided by stampings or perforations 16 in order in that way for example to form label-like individual elements 17. It will be appreciated in that respect that the stampings or perforations 16 do not involve the carrier foil 1. For that reason there is a relatively large sheet which has a plurality of individual elements 17 which can also be correspondingly individually removed from the carrier foil 1, which can be made easier by a suitable configuration of the separating surface, as indicated by the arrow a, between the base foil 3 and the adhesive 2, or by virtue of a suitable choice of the adhesive 2.

It can further be seen from the drawings that markings 19 are provided in the region of the interface 18 between the bonding or first adhesive layer 14 and the second adhesive layer 15. Those markings are preferably applied by a printing process and appropriately comprise a lacquer or a printing ink which is visible only upon illumination with light of a specific wavelength, for example upon illumination with UV-light. It will be appreciated that a prerequisite for the markings to be visible is that the various layers 10, 11, 13, 14 and 15 of the decorative layer arrangement 7 are suitably transparent.

Figure 2:
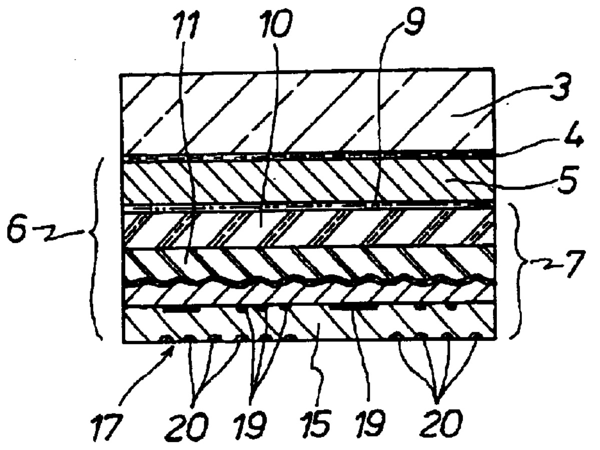
FIG. 2 shows an individual security element separated from the arrangement of FIG. 1 after individualisation and before being applied to a substrate.

While FIG. 1 shows a transfer foil, as can be found for example on the market and which the respective consumer uses in order to apply the individual label-like elements 17 to a substrate, FIG. 2 only shows one label-like element 17 in which—supplemental to the embodiment of FIG. 1—the second adhesive layer 15 is provided with items of individualising information, for example with details relating to the person of a pass holder, including pictures. For that purpose the adhesive layer 15 is suitably printed upon, as indicated at 20. The printing can be applied with conventional printing apparatuses, for example by means of thermal transfer printing, laser printing etc. In that respect it is to be assumed that, in spite of the partial printing at 20, the adhesive layer 15 adheres sufficiently firmly to the substrate provided only that the thickness of the adhesive layer 15 is sufficiently great and sufficient area remains in which adhesive without printing thereon directly adjoins the surface 21 of the substrate 8, for example an identity card or the like. If small particles are used to produce the printing 20, it is even possible to provide for printing over virtually the entire area as in that case the adhesive of the layer 15 can appropriately pass through between the individual particles.

Use of the transfer foil in accordance with the illustrate embodiment now takes place as follows:

In general terms, firstly the printing 20 is applied to the free surface of the adhesive layer 15. That can easily be effected for example by using as the carrier foil a paper web of standard format, which can then be inserted into commercially available printers which produce the desired printing (20) on the free surface of the adhesive layer 15.

Then, after the printing operation, at least one label-like individual element 17 is detached from the carrier foil 1, for example a piece of carrier paper. That is very easily possible if the base foil used is silicone paper which is siliconised on the surface 22 facing towards the adhesive layer 2 while the other surface which is joined to the carrier film 5 does not have any coating and therefore enjoys good adhesion.

The appropriately printed individual element 17 which is detached from the carrier foil 1 is then applied to a substrate and, preferably at a suitably elevated temperature of about 130° C., pressed against the surface 21 of the substrate.

In that way the adhesive layer 15 and consequently the entire decorative layer arrangement 7 is fixedly joined to the surface 21 of the substrate 8. At the same time the release layer 9 softens so that it is easily possible for the carrier film 5 and the base foil 3 fixedly connected thereto by means of the permanent adhesive layer 4 to be pulled off the decorative layer arrangement.

Then only the thin decorative layer 7 which corresponds to known decorative layer arrangements of hot stamping foils and which for example can form a security element still remains on the substrate, for example a document 8.

In FIG. 3, an illustration was adopted, in which the decorative layer arrangement 7 covers only a region of the surface 21 of the substrate. It will be appreciated that it would also be possible for example in the case of passports or the like for the size of the label-like individual elements 17 to be so selected that they are the same as the size of the substrate, that is to say for example they are of the same size as a page of a passport or the same size as a personal identity card.

The individual layers can for example be composed or selected as follows:

Carrier foil 1

The carrier foil used is preferably a carrier paper, paper involving a weight in relation to area of between 35 and 150 $g/m^2$ desirably being used.

Base foil 3

The base foil involves a reinforcing layer which is also known per se from labels. It is possible to use for example a plastic foil. Preferably however the base foil 3 used is a silicone paper, wherein the siliconised surface 22 is joined to the carrier foil 1 by way of a per se known bonding adhesive which is commonly used for such purposes.

Permanent adhesive 4

The function of the permanent adhesive is to ensure that the base foil 3 and the carrier film 5 remain firmly joined together even if heat is used to transfer the transfer foil onto the substrate. Those conditions are generally satisfied by current, permanently adhering acrylate dispersion adhesives.

Carrier film 5

Here the carrier films which are usual in relation to hot stamping foils are used, more appropriately using plastic films which have a very smooth surface in order not to adversely affect the transparency of the decorative layer arrangement 7 due to surface irregularities. In a very large number of cases the carrier film 5 used is in the form of polyester foils of a thickness of around 20 μm, while in the present case it is possible to use even thinner carrier films 5 as the carrier film 5 is in fact reinforced during handling by the base foil 3.

Release layer 9

The release layer 9 is generally applied over the full area in a layer thickness of between about 0.01 and 0.2 μm. It can be for example of the following composition:

Toluene 995 g

Ester wax (drop point: 90° C.) 5 g

Protective lacquer layer 10

The protective lacquer layer 10 is also generally applied over the full area, more specifically in a layer thickness of between 0.5 and 5.0 μm, preferably between 1 and 2 μm. The composition of the protective lacquer layer 10 can be as follows:

MEK 400 g

Toluene 150 g

Cyclohexanone 200 g

Cellulose nitrate (low viscosity, 65 percent in alcohol) 140 g

Methylmethacrylate (d=1.17 $g/m^3$, sp/c=40–50 $cm^3/g$) 100 g

Replication lacquer layer 11

The replication lacquer layer 11 can be applied over the full area but also in a region-wise manner, more specifically if for example it were to be the case that the structure 12 with the holographic or optical-diffraction action is provided only in a region-wise manner. The layer thickness of the replication lacquer layer 11 is between 0.05 and 1.5 μm. It can be of the following composition:

Cyclohexanone 200 g

Methylmethacrylate (d=1.17 $g/m^3$.

mp>130° C.) 12 g

Polyvinylchloride terpolymer (Tg=90° C.) 5 g

Ethyl acetate 200 g

Structure 12

The structure 12 can be a generally known structure which has an optical-diffraction or holographic action and which is conventionally used for so-called OVDs, for example a diffraction structure, wherein the optical properties of the structure 12 are determined by the corresponding structure parameters, for example grating frequency, grating depth, grating inclination etc. The structure 12 is generally applied to the replication lacquer layer 11 in a replication process during manufacture of the hot stamping foil 6.

HRI (highly reflective) layer 13

The function of the highly reflective layer 13 is to improve the visibility of the structure 12 with the optical-diffraction or holographic action, in which respect, as consideration of FIG. 3 reveals, it is necessary at the same time to ensure that the viewer can see through the layer 13 in order to perceive the markings 19 and the printing 20.

That function can be performed for example by a vapour-deposited, highly refractive layer, of a thickness of between 10 and 500 nm, in which respect for example metal oxides, metal sulphides, titanium dioxide etc. can perform that task.

Adhesive layers 14 and 15

As already mentioned it is possible for the two layers 14 and 15 to be produced from the same transparent material. It would however also be possible for the layer 14 to be provided only as a bonding layer between the adhesive layer 15 and the coating 13 on the structure 12.

In the illustrated embodiment it is assumed that two identical adhesive layers are used, which involve the full area and which are of a layer thickness of between 2 and 10 μm, preferably between 3 and 6 μm. The adhesive layers can be of the following composition:

MEK 250 g

Toluene 340 g

Vinylchloride-vinylacetate copolymer (mp:80° C.) 120 g

Thermoplastic polyurethane (d=1.18 g/cm$^3$) 165 g

Silicic acid, hydrophobised (particle size about 10 μm) 60 g

Markings 19

The markings 19 preferably involve elements which are applied in a printing process after application of the first adhesive layer, for example specific graphic elements, a text which is only visible under given viewing conditions, and so forth. In the specific embodiment it is assumed that the markings 19 are formed by a decorative lacquer responsive to UV-light, which can be of the following composition:

MEK 2000 g

Butylacetate 600 g

Cyclohexanone 200 g

Methylmethacrylate (d=1.15 g/m$^3$,

Tg=50° C.) 200 g

PVC/PVAC mixed polymer (softening point: 90° C.) 500 g

Methylmethacrylate (d=1.16 g.m$^3$, n sp/c=40–50 cm$^3$/g) 130 g

Diacetone alcohol 100 g

High-molecular dispersing additive 80 g

Luminescence pigment (organic/inorganic) 125 g

Printing 20

The printing 20 applied to the free surface of the adhesive layer 15, as already mentioned, is produced by familiar printing processes, for example by means of laser printers, thermal transfer printers etc. Theoretically it would also be conceivable for further markings to be applied by hand instead of printing 20. Laser or thermal transfer printing however are to be preferred because in that case, as a result of the transfer foil being fixed on the substrate 8 under the effect of heat, it is to be assumed that the particles producing the print at least partially also adhere directly to the substrate. If in such a situation the attempt is then made to detach the decorative layer arrangement 7 from the substrate 8, it is to be reckoned that at least residues of the printing 20 serving for identification purposes also remain so firmly adhering directly to the substrate 8 that detachment of the decorative layer arrangement 7 cannot be achieved, without leaving behind traces.

Production of the transfer foil is usually effected in such a way that firstly a hot stamping foil 6 is produced using the familiar processes for that purpose, that is to say essentially by means of printing processes, and the hot stamping foil 6 is then fixedly joined to an adhesive composite comprising the carrier foil 1 and the base foil 3 by means of the permanent adhesive 4, for example by a per se known lamination process.

What is claimed is:

1. A transfer foil for applying a decorative layer arrangement comprising at least one lacquer layer and a heat-activatable adhesive layer to a substrate, wherein the transfer foil comprises a base foil which is formed by a paper web and which is joined by means of a permanent adhesive to a first surface of a carrier film, at a second surface of the carrier film is arranged the decorative layer arrangement which is releasable from the carrier film under the effect of heat and which on its side remote from the carrier film has the heat-activatable adhesive layer which serves for joining to the substrate, wherein the base foil is siliconised on its surface remote from the carrier film and releasably adheres with said siliconised surface to a carrier foil.

2. A transfer foil according to claim 1, wherein the base foil with the carrier film and the decorative layer arrangement is subdivided into a plurality of individual elements, wherein a plurality of such individual elements are releasably arranged on a carrier foil web.

3. A transfer foil according to claim 2, wherein the individual elements are formed by stamping or perforation of the base foil, the carrier film and the decorative layer arrangement along their intended peripheral edges.

4. A transfer foil according to claim 1 wherein, the decorative layer arrangement is transparent and the adhesive layer which serves for fixing the decorative layer arrangement to the substrate can be printed upon by means of a printer.

5. A transfer foil according to claim 1, wherein the decorative layer arrangement has at least one replication lacquer layer provided at a surface with a structure having an optical-diffraction and/or holographic action.

6. A transfer foil according to claim 5, wherein the structure which has an optical-diffraction and/or holographic action carries a transparent layer of a material whose refractive index is markedly higher than that of the transparent replication lacquer layer.

7. A transfer foil according to claim 5, wherein the structure having an optical-diffraction and/or holographic action carries a vapor deposited layer of ZnS, $TiO_2$, SiO or a material which enhances the visibility of the structure in terms of refraction.

8. A transfer foil according to claim 1, wherein the heat-activatable adhesive layer serving for fixing to the substrate is formed by two adhesive layer portions, between which is arranged a marking produced in a printing process.

9. A transfer foil according to claim 8, wherein the marking is formed by printing inks which are perceivable only upon illumination with light of predetermined wavelength ranges.

10. A transfer foil according to claim 1, wherein the transfer foil includes the following mutually adjoining constituents:

a carrier foil web, a web of silicone paper having a siliconized surface and a non-siliconized surface, wherein the silicone paper web releasably adheres with its siliconized surface to the carrier foil web, a carrier film which is joined by means of a permanent adhesive to the non-siliconized surface of the silicone paper web, and on the free surface of which there are successively provided:

an optional release layer, a transparent replication lacquer layer having at its surface remote from the carrier film a structure which has an optical-diffraction and/or holographic action, a layer which at least partially covers the structure and which is of a material of a high refractive index in comparison with the replication lacquer layer, a heat-activatable adhesive layer, and the replication lacquer layer, the layer of highly refractive material and the heat-activatable adhesive layer are transparent and the adhesive layer forming the surface of the transfer foil, which is remote from the carrier foil web, is formed by a material which can be printed upon by means of a printer.

11. A transfer foil according to claim 10, wherein the transfer foil further includes a second transparent, heat-activatable adhesive layer and between the two heat-activatable adhesive layers a printed marking.

* * * * *